United States Patent [19]

Takahashi

[11] Patent Number: 4,546,647
[45] Date of Patent: Oct. 15, 1985

[54] SYSTEM FOR DIAGNOSING AN INTERNAL COMBUSTION ENGINE

[75] Inventor: Toshio Takahashi, Mitakashi, Japan
[73] Assignee: Fuji Jukogyo Kabushiki Kaisha, Tokyo, Japan
[21] Appl. No.: 535,486
[22] Filed: Sep. 26, 1983
[30] Foreign Application Priority Data
 Sep. 30, 1982 [JP] Japan ................ 57-171506
[51] Int. Cl.[4] ........................ G01M 15/00
[52] U.S. Cl. .................... 73/118; 340/52 F
[58] Field of Search ............ 73/116, 118, 119 R; 340/52 R, 52 F; 123/480, 494

[56] References Cited

U.S. PATENT DOCUMENTS

| | | | |
|---|---|---|---|
| 3,938,075 | 2/1975 | Reddy | 340/52 R |
| 4,217,863 | 8/1980 | Ezoe | 123/494 |
| 4,219,798 | 8/1980 | Frister | 340/52 F |
| 4,244,340 | 1/1981 | Herth et al. | 123/440 |
| 4,246,566 | 1/1981 | Endo et al. | 340/52 F |

Primary Examiner—Jerry W. Myracle
Attorney, Agent, or Firm—Martin A. Farber

[57] ABSTRACT

A system for diagnosing an internal combustion engine having an air-flow meter. The air-flow meter comprises a voltage divider including a variable resistor. A wiper of the variable resistor is operatively connected to a flap in an intake passage so as to produce an output voltage, responsive to the volume of the intake air. A computer is provided for computing the volume of the intake air from the output voltage and a fixed voltage at one end of the variable resistor. A smoothing capacitor is provided for filtering the output voltage and a resistor is connected in parallel to the capacitor for discharging thereof and a diagnosing circuit is provided to respond to the output voltage for producing a diagnosis signal when the output voltage decreases to a predetermined level.

16 Claims, 5 Drawing Figures

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of an air-flow meter system which operates to measure the volume of intake air of an engine mounted on a motor vehicle.

A fuel-injection system of the type which is provided with a computer operable to compute the volume of intake air from an output signal from the air-flow meter in order to produce output signals for driving solenoid-operated injection valves is known. If a fault occurs, such as a disconnection of wires for the air-flow meter or disengagement of a connector of the air-flow meter from a terminal of a unit, control of the air-fuel ratio of injected fuel can not be done. Accordingly, such a fault is immediately detected to operate a fail-safe system so as to prevent stalling of the engine. A conventional detecting means comprises a potentiometer operated by a flap in an intake passage and a smoothing capacitor. When the voltage at the capacitor decreases to a low level by the fault, the fail-safe system operates. Since the voltage at the capacitor fluctuates during the normal operation of the engine, the voltage, at which the fail-safe system becomes operative, is set to a considerably low level in order to prevent misjudging of the detection. Therefore, a relatively long time elapses before the voltage decreases to the preset low level at the fault, so that the engine stalls.

SUMMARY OF THE INVENTION

It is an object of the present invention to provide a system for diagnosing fault in an air-flow meter system which may quickly detect the fault of the air-flow meter system so as to prevent stalling of an engine caused by the fault.

According to the present invention, there is provided a system for diagnosing an internal combustion engine having an air-flow meter, said air-flow meter comprising a variable resistor responsive to the volume of the intake air for producing an output voltage; a computer for computing the volume of the intake air from said output voltage and a fixed voltage at one end of said variable resistor; a smoothing capacitor for filtering said output voltage; a resistor connected in parallel to said smoothing capacitor; and a diagnosing circuit responsive to said output voltage for producing a diagnosis signal when said output voltage decreases to a predetermined level.

The present invention will be more apparent from the following description made with reference to the accompanying drawings.

DETAILED DESCRIPTION OF THE PREFERRED EMBODIMENT

Figure 1:
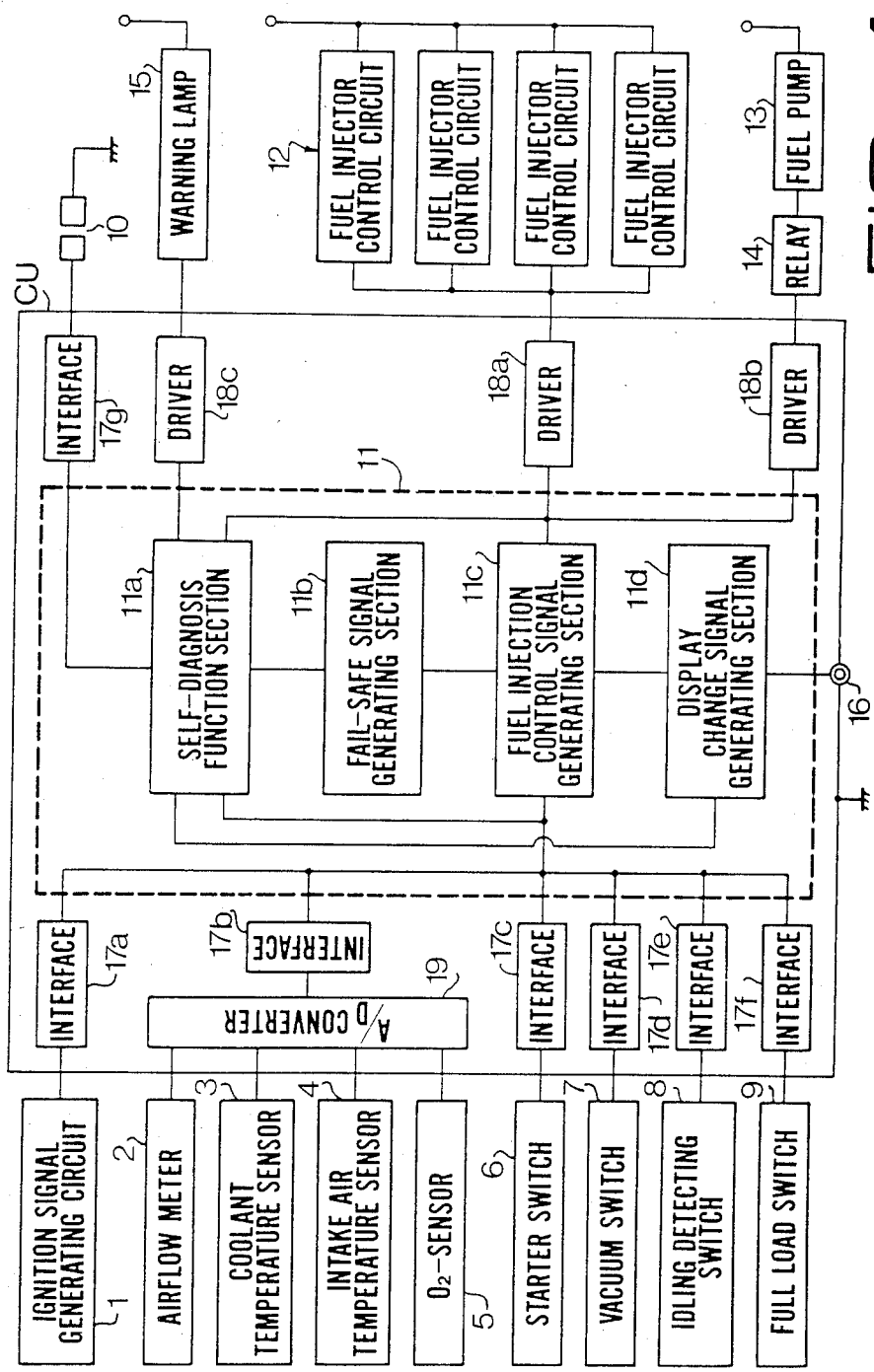
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises a computor 11 including memories, I/O and timers, an interface group 17a to 17g, drivers 18a to 18c. The detecting means group comprises an ignition signal generating circuit 1, the output signal of which represents an ignited cylinder of the engine and the ignition timing thereof, an air-flow meter 2, a coolant temperature sensor 3, an intake air temperature sensor 4, and an $O_2$-sensor 5 for detecting oxygen concentration in exhaust gases. The detecting means group further comprises a starter switch 6 for detecting operation of the starter of the engine, a vacuum switch 7 for detecting the vacuum in an intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking of fault. When the terminal 10 is connected to the ground at a shop, a fault condition memorized in the display change signal generating section 11d is displayed by the lamp 16. During driving of the motor vehicle, the terminal 10 is disconnected from the ground. The output of the ignition signal generating circuit 1 is applied to self-diagnosis function section 11a and fuel injection control signal generating section 11c through the interface 17a. Outputs of the air-flow meter 2 and sensors 3 to 5 are applied to sections 11a and 11c through an A/D converter 21 and the interface 17b. Further, outputs of switches 6 to 9 are applied to sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c to warn the fault. Further, when such a serious engine trouble that will stall the engine occurs, the self-diagnosis function section 11a sends a diagnosis signal dependent on the kind of the engine trouble to the fail-safe signal generating section 11b. The fail-safe signal generating section 11b stores data to avoid the engine stalling caused by the engine trouble and produces a fail-safe signal dependent on the diagnosis signal.

The fail-safe signal is fed to the fuel injection control signal generating section 11c which operates to stop input from the detecting means group 1 to 9.

In normal engine operation, the fuel injection control signal generating section 11c operates to produce an air-fuel ratio control signal by computing inputs applied from the engine operation detecting means group 1 to 9. The air-fuel ratio control signal is fed to a fuel pump 13 through the driver 18b and a relay 14 and to fuel injector control circuits 12 through the driver 18a so as to inject a proper amount of fuel at a proper time. Further, the fuel injection control signal generating section 11c sends the display change signal generator signal to a switching section 11d in response to an input from the O₂-sensor 5. The switching section 11d sends the signal to a monitor lamp 16 in response to the signal from the fuel injection control signal generating section 11c to indicate that the exhaust gases have a normal oxygen concentration.

When the fail-safe signal is fed from the fail-safe signal generating section 11b to the fuel injection control signal generating section 11c, the section 11c produces a quasi air-fuel ratio control signal dependent on the fail-safe signal. The quasi air-fuel ratio control signal is sent to fuel injector control circuits 12, so that the engine continues to operate in accordance with the quasi signal without stalling.

Further, the switching section 11d sends a signal to the lamp 16 in dependency on the diagnosis signal fed from the self-diagnosis function section 11a. The lamp 16 intermittently lights in accordance with a pattern which is decided by the diagnosis signal by connecting the terminal 10 to the ground at a shop. An inspector in the shop can recognize the kind of the engine trouble by the pattern of the lighting of the lamp 16.

Figure 2:
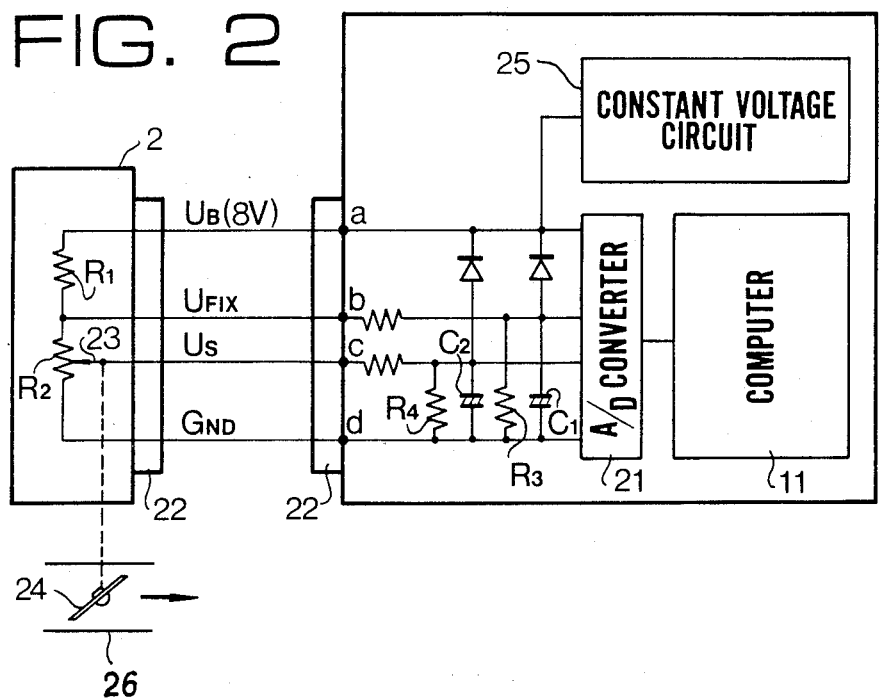
FIG. 2 is an air-flow meter diagnosing circuit according to the present invention.

FIG. 2 shows an air-flow meter diagnosing circuit according to the present invention. The air-flow meter 2 comprises a potentiometer as a voltage divider consisting of resistors R1, R2, a wiper 23 slidably engaging the resistor R2, and a flap 24 provided in an intake passage 26 to the engine and operatively connected to the wiper 23. The air-flow meter 2 is connected to the control unit CU by a connector 22 and leads. One end of the resistor R1 is connected to the A/D converter 21 through a terminal a and applied with a constant-voltage UB (for example 8 volts) from a constant voltage circuit 25. An intermediate point between resistors R1 and R2 is connected to the A/D converter through a terminal b, so that a reference fixed voltage $U_{FIX}$ is applied to the A/D converter. A voltage at the wiper 23, that is the output voltage US of the air-flow meter 2 is applied to the A/D converter through a terminal C. Further, the ground voltage GND is applied through a terminal d. A smoothing capacitor C1 and a resistor R3 are connected in parallel between an input terminal of the A/D converter for the reference fixed voltage $U_{FIX}$ and the ground, and a smoothing capacitor C2 and a resistor R4 are also connected in parallel between an input for the voltage US and the ground. The computor 11 is applied with signals corresponding to the voltages US and $U_{FIX}$ to compute the amount of intake air. The amount of the intake air Q can be obtained by the following formula:

$$Q = A(U_{FIX} - US)/UB$$

where A is a constant.

In accordance with the present invention, the self-diagnosis function section 11a (FIG. 1) of the computer 11 monitors the level of the voltage US and produces a diagnosis signal for fail-safe operation, when the level of the voltage US decreases to a predetermined low level.

Figure 3:
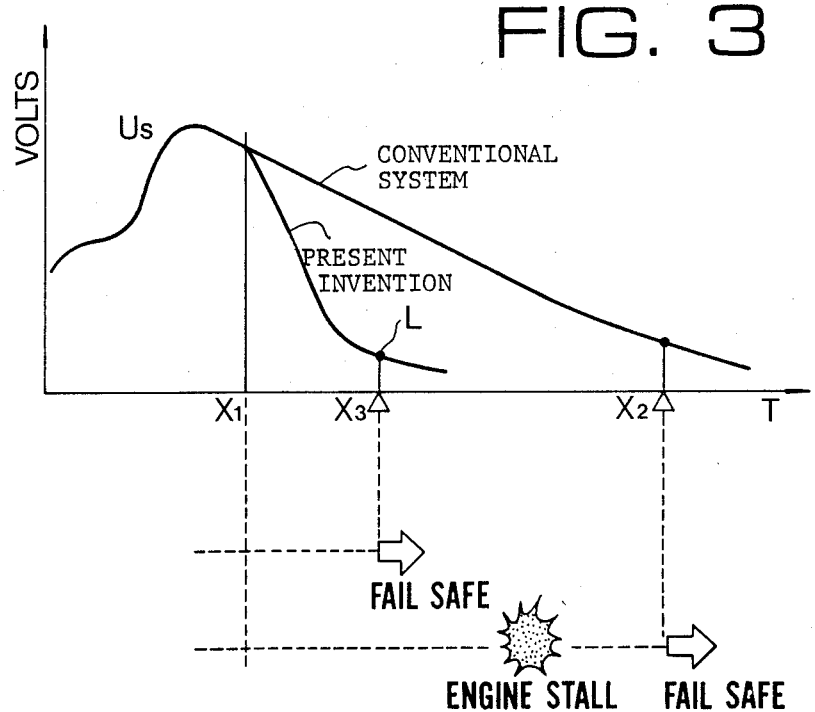
FIG. 3 is a graph showing fail-safe generating times according to the system of the present invention and to a conventional system.

Referring to FIG. 3, assuming that the connector 22 disengages at a time X1, capacitors C1 and C2 discharge, so that the voltages $U_{FIX}$ and US decrease as illustrated. A conventional diagnosis system without resistors R3 and R4 monitors the level of the voltage US to produce a fail-safe signal. Since the voltage US fluctuates at considerably large amplitudes during a normal operating condition of the engines, the conventional diagnosis system generates a fail-safe signal at a time X2 when the voltage US decreases to a very low level in order to avoid misjudgement. Therefore, a long time elapses before the fail-safe signal is generated, resulting in stalling of the engine before fail-safe operation starts.

In the system of the present invention, since the resistor R4 is connected to the capacitor C2 for discharging thereof, the capacitor quickly discharges. Therefore, the fail-safe signal is generated at a time X3 when the level decreases to a low level. Accordingly, the fail-safe signal can be produced early so as to avoid engine stalling.

Figure 4:
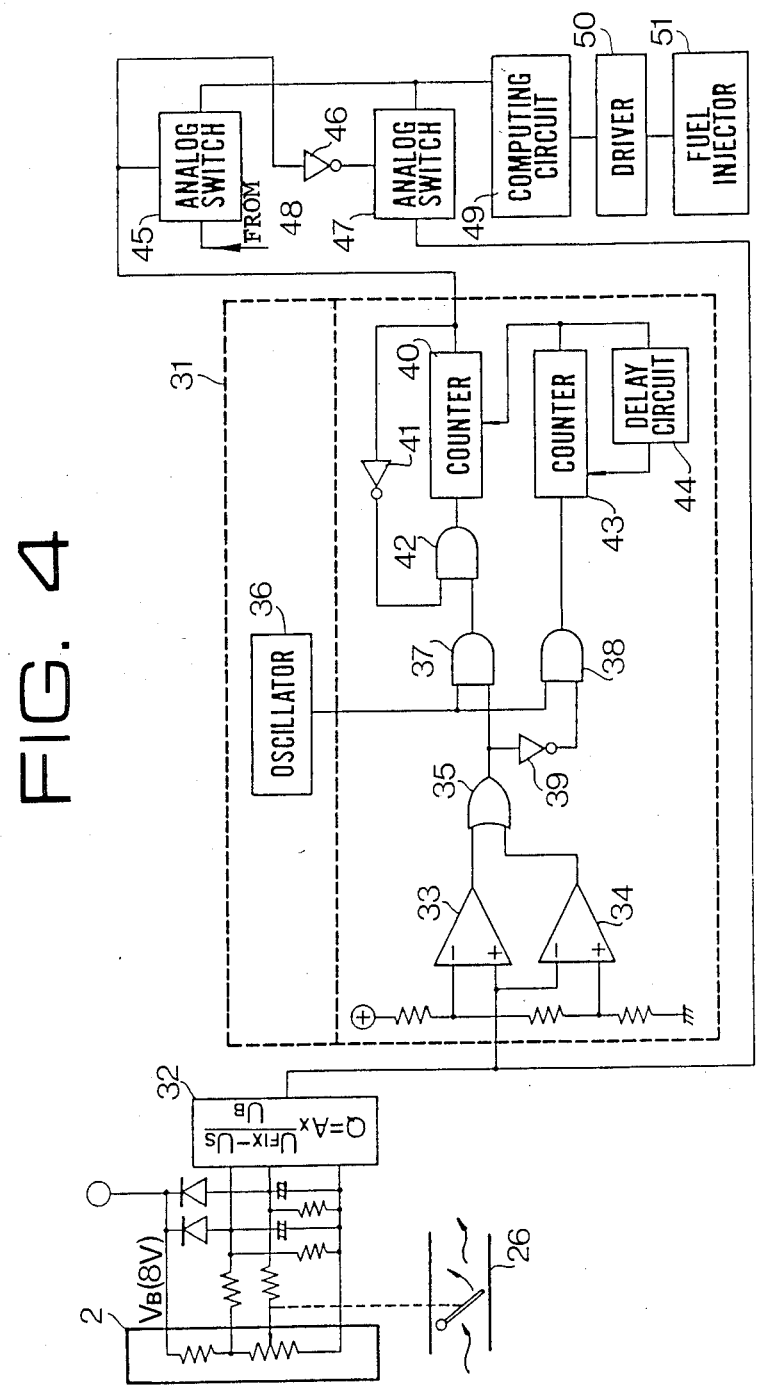
FIG. 4 is a block diagram showing a diagnosis system according to the present invention.

FIG. 4 shows an example of a self-diagnosis function system. The system comprises a computing circuit 32 for computing the amount of intake air Q, a diagnosing circuit 31. The output voltage Q of the computing circuit 32 is applied to a window comparator comprising OP amps 33 and 34 and an OR gate 35 in the diagnosing circuit 31 and further applied to a computing circuit 49 through an analog switch 47. The output of the window comparater of the diagnosing circuit 31 is applied to an AND gate 37 and also applied to an AND gate 38 through an inverter 39. AND gates 37 and 38 are applied with pulses from an oscillator 36 to produce pulses dependent on the output of the window comparator.

The diagnosing circuit 31 is provided with a first counter 40 for detecting the fault of the air-flow meter system and a second counter 43 for resetting the first counter 40.

If the voltage US decreases and the voltage Q decreases to a predetermined low level by the window comparator, the output of the OR gate 35 becomes high, so that the AND gate 37 produces pulses. The pulses are applied to the counter 40 through an AND gate 42. When the count of the counter 40 exceeds a set count corresponding to the predetermined level (FIG. 3), the counter 40 produces a high level output. The output is applied to the other input of the AND gate 42 through an inverter 41, so that the AND gate 42 is closed to hold the output of the counter 40. The output of the counter 40 is applied to a control gate of an analog switch 45 to make it and also applied to the control gate of the analog switch 47 through an inverter 46 to break the switch. It is necessary to reset the counter 40, if the trouble in the air-flow meter system recovers after a short time. The counter 43 is to reset the counter 40. The output of the OR gate 35 is at a low level in normal operating conditions, so that the AND gate 38 is opened to produce pulses. When the number of pulses applied the counter 43 reaches to a predetermined value which corresponds to the above described short time, the counter 43 produces an output. The output is applied to a reset terminal of the counter 40 to reset it and also applied to an own reset terminal through a delay circuit 44. Thus, the reset operation of the counters 40 and 43 is repeated as long as the air-flow meter system is in normal condition. When a fault occurs in the air-flow meter system and the analog switch 45 is made by the output of the counter 40, a fail-safe signal from a fail-safe circuit 48 (FIG. 5) corresponding to the fail-safe signal generating circuit 11b of FIG. 1 is fed to the computing circuit 49 through the switch 45. The computing circuit 49 produces a quasi air-fuel ratio control signal in response to the fail-safe signal and with reference to data stored therein. The quasi air-fuel ratio control signal is fed to a fuel injector 51 through a driver 50 to inject the fuel at a proper air-fuel ratio so as to keep the engine operation.

Figure 5:
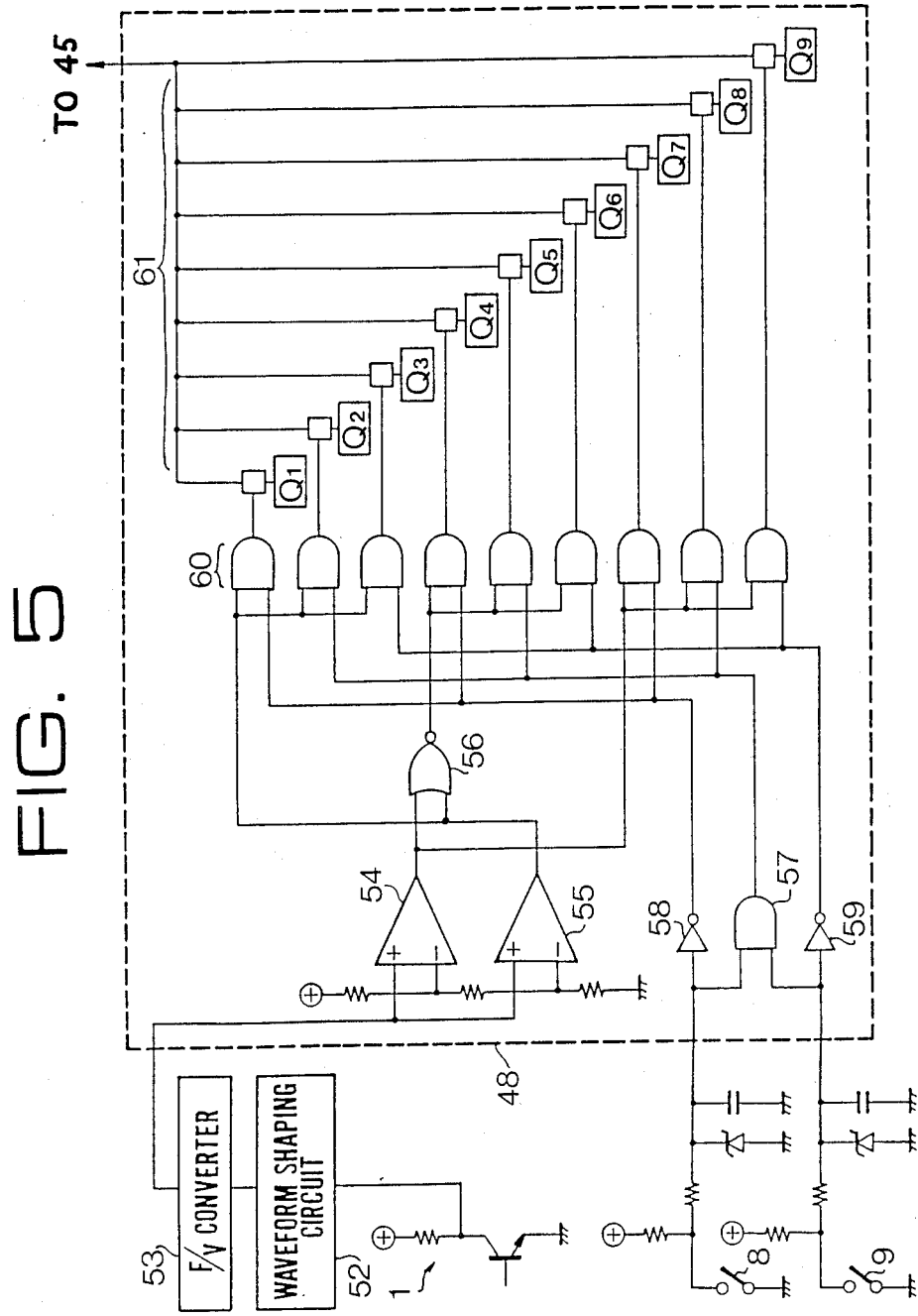
FIG. 5 is a circuit for generating fail-safe signals.

Referring to FIG. 5 showing a fail-safe circuit 48, the circuit is adapted to produce nine kinds of fail-safe signals. A speed signal is produced by a waveform shaping circuit 52 for circuit 1 and by a frequency-to-voltage (F/V) converter 53 and is applied to a window comparator comprising OP amps 54 and 55 and a NOR gate 56. Throttle position signals are obtained by the idling detecting switch 8 and the full load switch 9 and are applied to inverters 58 and 59 and an AND gate 57, respectively. Outputs of OP amps 54, 55, NOR gate 56, inverters 58, 59 and AND gate 57 are combined and applied to nine AND gates 60 to produce one of nine outputs in dependency on engine operating conditions. Outputs of the AND gates 60 are connected to control gates of analog switches 61, respectively. The analog switches 61 pass fail-safe signals Q1 to Q9 in dependency on the outputs of the AND gates 60, respectively. Thus, one of the fail-safe signals is fed to the computing circuit 49 in accordance with engine operating conditions.

From the foregoing it will be understood that, in accordance with the present invention, since a discharging resistor is connected to a smoothing capacitor, fault can be quickly detected by rapid discharge of the capacitor. Accordingly, fail-safe operations can be quickly effected so as to avoid stalling of an engine.

What is claimed is:

1. In a system for diagnosing an internal combustion engine having an air-flow meter, said air-flow meter comprising a variable resistor responsive to the volume of the intake air for producing an output voltage and a computer for computing the volume of the intake air from said output voltage and a fixed voltage at one end of said variable resistor, the improvement comprising
   a smoothing capacitor for filtering said output voltage;
   a second resistor connected in parallel to said smoothing capacitor so as to discharge the capacitor upon a fault with respect to said air-flow meter, said computer being arranged for computing the volume of the intake air from the voltage across the smoothing capacitor; and
   a diagnosing circuit responsive to an output of said computer for producing a diagnosis signal when said output voltage decreases to a predetermined level.

2. The system for diagnosing an internal combustion engine according to claim 1 wherein said air-flow meter comprising a voltage divider comprising a resistor and a variable resistor a wiper of which is operatively connected to a flap provided in an intake passage of said engine.

3. In a system for diagnosing an internal combustion engine having an air-flow meter, said air-flow meter comprising a variable resistor responsive to the volume of the intake air to the engine for producing an output voltage, the improvement comprising
   a smoothing capacitor for filtering said output voltage producing an output voltage at said capacitor;
   discharge means comprising another resistor connected in parallel to said smoothing capacitor for discharging the capacitor upon a fault with respect to said air-flow meter, and
   means comprising a diagnosing circuit for producing a diagnosis signal when said output voltage at said capacitor decreases to a predetermined level.

4. The system according to claim 3, further comprising
   a diagnosing circuit comprising,
   comparator means for detecting the fault of said airflow meter by operatively comparing the level of the output voltage at said capacitor with a predetermined reference.

5. The system according to claim 4, wherein said diagnosing circuit further comprising,
   a counter- and logic circuit operatively connected to said comparator means comprising a first AND gate, a second AND gate and a first counter connected in series, an output of said counter being fed back via a first inverter to another input of said second AND gate, and an oscillator connected to an input of said first AND gate, the other input of said first AND gate is operatively connected to said comparator means.

6. The system according to claim 5, wherein said counter- and logic circuit further comprises
   a third AND gate and a second counter connected to an output of said third AND gate, said second counter having an output connected to reset inputs of said first and second counters, one input of said third AND gate is connected to said oscillator, and a second inverter is operatively connected between said comparator means and said other input of said third AND gate.

7. The system according to claim 6, wherein said counter- and logic circuit further comprises
   a delay circuit connected between said output and reset input of said second counter.

8. The system according to claim 4, wherein said comparator means comprises a window comparator comprising two comparators and an OR gate connected between outputs of said two comparators and said other input of said first AND gate and said other input of said third AND gate via said second invertor.

9. The system for diagnosing an internal combustion engine according to claim 3, wherein
   the other end of said variable resistor and a common end of said capacitor and said second resistor are connected,
   a constant voltage circuit,
   a third resistor connected between said constant voltage circuit and said one end of said variable resistor.

10. The system for diagnosing an internal combustion engine according to claim 9, further comprising
    a fourth resistor and another smoothing capacitor connected in parallel across said variable resistor.

11. The system for diagnosing an internal combustion engine according to claim 9, further comprising
    a diode connected between said constant voltage circuit and the other end of said capacitor and said second resistor.

12. The system for diagnosing an internal combustion engine according to claim 11, further comprising
    a fourth resistor and another smoothing capacitor connected in parallel across said variable resistor.

13. The system for diagnosing an internal combustion engine according to claim 12, further comprising
    another diode connected between said constant voltage circuit and said one end of said variable resistor.

14. The system for diagnosing an internal combustion engine according to claim 9, wherein
    said common end of said smoothing capacitor and said second resistor is grounded.

15. The system for diagnosing an internal combustion engine according to claim 3, further comprising
a third resistor and another smoothing capacitor connected in parallel across said variable resistor.

16. The system for diagnosing an internal combustion engine according to claim 3, further comprising
a fail-safe circuit means for generating a respective fail-safe signal dependent on specific detected conditions of operation of the engine, and
gate means responsive to said diagnosing signal for passing said respective fail-safe signal therethrough.

* * * * *